(12) United States Patent
Kessler et al.

(10) Patent No.: US 11,746,456 B2
(45) Date of Patent: Sep. 5, 2023

(54) DETERMINATION OF TREATMENT PARAMETERS VIA A GEOMETRY INFORMATION ITEM OF A TEXTILE

(71) Applicant: Henkel AG & Co. KGaA, Duesseldorf (DE)

(72) Inventors: Arnd Kessler, Monheim am Rhein (DE); Christian Nitsch, Duesseldorf (DE); Lars Zuechner, Langenfeld (DE); Georg Wawer, Vienna (AT); Alexander Mueller, Monheim (DE); Clemens Arth, Graz (AT)

(73) Assignee: HENKEL AG & CO. KGAA, Duesseldorf, NY (US)

( * ) Notice: Subject to any disclaimer, the term of this patent is extended or adjusted under 35 U.S.C. 154(b) by 0 days.

(21) Appl. No.: 16/466,858

(22) PCT Filed: Dec. 7, 2017

(86) PCT No.: PCT/EP2017/081847
§ 371 (c)(1),
(2) Date: Jun. 5, 2019

(87) PCT Pub. No.: WO2018/114356
PCT Pub. Date: Jun. 28, 2018

(65) Prior Publication Data
US 2020/0063320 A1 Feb. 27, 2020

(30) Foreign Application Priority Data

Dec. 21, 2016 (DE) .................... 10 2016 225 809.5

(51) Int. Cl.
*D06F 39/00* (2020.01)
*D06F 33/37* (2020.01)
(Continued)

(52) U.S. Cl.
CPC .............. *D06F 33/37* (2020.02); *D06F 39/02* (2013.01); *D06F 58/30* (2020.02); *G06T 7/521* (2017.01);
(Continued)

(58) Field of Classification Search
CPC .......... D06F 33/37; D06F 33/57; D06F 34/18; D06F 2202/10; D06F 2103/02; D06F 2103/04; D06F 2103/06
See application file for complete search history.

(56) References Cited

U.S. PATENT DOCUMENTS 7,200,511 B2 4/2007 Damrath
9,243,987 B2 1/2016 Chanda et al.
(Continued)

FOREIGN PATENT DOCUMENTS

CN 101555659 A 10/2009
CN 102517842 A 6/2012
(Continued)

OTHER PUBLICATIONS

EP2740828—Machine Translation (Year: 2014).*
(Continued)

*Primary Examiner* — Marc Lorenzi
(74) *Attorney, Agent, or Firm* — Lorenz & Kopf, LLP

(57) ABSTRACT

A method performed by one or more devices is disclosed. The method includes obtaining a geometry information item representative of a spatial location of a plurality of points of a surface of a textile (52), determining at least one treatment parameter for treating the textile (52) at least partially based on a geometry information item, and outputting or triggering an output of the at least one treatment parameter.

8 Claims, 11 Drawing Sheets

(51) Int. Cl.
  *G06T 7/521* (2017.01)
  *G06T 7/593* (2017.01)
  *D06F 58/30* (2020.01)
  *D06F 39/02* (2006.01)
  *D06F 34/18* (2020.01)
  *D06F 103/02* (2020.01)
  *D06F 105/42* (2020.01)

(52) U.S. Cl.
  CPC .............. *G06T 7/593* (2017.01); *D06F 34/18* (2020.02); *D06F 2103/02* (2020.02); *D06F 2105/42* (2020.02)

(56) References Cited

U.S. PATENT DOCUMENTS

| | | | |
|---|---|---|---|
| 9,416,479 | B2 | 8/2016 | Leitert et al. |
| 9,920,470 | B2 | 3/2018 | Tautz et al. |
| 2002/0146153 | A1 | 10/2002 | Hu et al. |
| 2003/0019253 | A1* | 1/2003 | Lorenz .................. D06F 34/18 356/440 |
| 2010/0205820 | A1* | 8/2010 | Ashrafzadeh ........... D06F 58/36 34/88 |
| 2010/0205826 | A1 | 8/2010 | Ashrafzadeh et al. |
| 2012/0017653 | A1* | 1/2012 | Doh ..................... D06F 39/02 68/17 R |
| 2013/0312202 | A1* | 11/2013 | Balinski ................ D06F 34/18 8/137 |
| 2015/0292142 | A1 | 10/2015 | Tautz et al. |

FOREIGN PATENT DOCUMENTS

| | | | |
|---|---|---|---|
| CN | 103334265 | A | 10/2013 |
| CN | 204959394 | A1 | 1/2016 |
| CN | 105603678 | A | 5/2016 |
| DE | 29824311 | U1 | 1/2001 |
| DE | 10156157 | A1 | 5/2003 |
| DE | 102011087274 | A1 | 5/2013 |
| DE | 102012024103 | A1 | 6/2014 |
| DE | 102014104635 | A1 | 11/2014 |
| DE | 102013210996 | A1 | 12/2014 |
| DE | 102013215219 | A1 | 2/2015 |
| DE | 102013114440 | A1 | 6/2015 |
| EP | 1225267 | A1 | 7/2002 |
| EP | 2740828 | A1 | 6/2014 |
| EP | 2930264 | A1 | 10/2015 |
| JP | 2001224890 | A | 8/2001 |
| JP | 2015043796 | A | 3/2015 |
| WO | 02082363 | A1 | 10/2002 |
| WO | 2004055256 | A1 | 7/2004 |

OTHER PUBLICATIONS

CN204959394—Machine Translation (Year: 2016).*
EPO, International Search Report and Written Opinion issued in International Application No. PCT/EP2017/081847, dated Feb. 21, 2018.
Kanade et al.: "Development of a Video-Rate Stereo Machine", Proceedings of International Robotics and Systems Conference 1995, vol. 3, pp. 95-100.
Faugeras et al.: "Real time correlation-based stereo: algorithm, implementations and applications", Institut National de Recherche en Informatique et en Automatique (INRIA), Rapport de Recherche, Programme 4, No. 2013, Aug. 1993.
Mell et al.: "The NIST Definition of Cloud Computing", Recommendations of the National Institute of Standards and Technology Special Publication 800-145, Sep. 2011.

* cited by examiner

DETERMINATION OF TREATMENT PARAMETERS VIA A GEOMETRY INFORMATION ITEM OF A TEXTILE

CROSS-REFERENCE TO RELATED APPLICATIONS

This application is a U.S. National-Stage entry under 35 U.S.C. § 371 based on International Application No. PCT/EP2017/081847, filed Dec. 7, 2017, which was published under PCT Article 21(2) and which claims priority to German Application No. 10 2016 225 809.5, filed Dec. 21, 2016, which are all hereby incorporated in their entirety by reference.

TECHNICAL FIELD

The present disclosure relates to methods and devices with which at least one treatment parameter for a treatment of the textile is determined via a geometry information item representative of the spatial position of a plurality of points of a surface of a textile, in particular, for a cleaning of a textile.

BACKGROUND

Textiles must undergo regular treatments, such as a cleansing treatment, when used. In particular, the type of the cleaning device, the cleaning agent and their interaction are factors for effective cleaning in a cleaning treatment. For example, while the physical cleaning operation is performed by the cleaning device, the cleaning agent is involved in the actual chemical and biological processes for destroying bacteria, fungi and viruses, as well as removing persistent contaminants.

The user typically manually selects a particular type of treatment with appropriate treatment parameters, for example, a washing program based on the type of textiles to be cleaned. In particular, a cleaning information item given on labels on the textiles can be used here. A further treatment parameter is, for example, the amount of cleaning agent, such as the dosage of a washing agent. The determination of the amount of cleaning agent to be used is usually based on the experience of the user and a manual estimate of the amount and size of the textiles to be cleaned and is therefore often inaccurate.

The selection of the treatment parameters, for example, the amount of cleaning agent for a washing machine or the settings of a dryer, is crucial for the effectiveness of the treatment of the textiles with regard to the quality of the treatment result and the ecological and economic effects. If, for example, an insufficient amount of cleaning agent is used, the textiles are not completely cleaned, so that the cleaning treatment must be repeated or the cleaning must be reworked manually. If the amount of cleaning agent used is too high, on the one hand, too much cleaning agent is consumed, thus causing unnecessary costs. On the other hand, the environment and the material of the textile are additionally burdened.

In principle, the selection of treatment parameters can be facilitated or even automated when the textiles are provided with markings designed for this purpose. A method for managing textiles or textile pieces is known from WO 04/055256 A1. The textile pieces are equipped with an identification feature (for example, an RFID tag), which can, in particular, contain a unique identification code, information items on the type of fiber, colorant, color and washing history.

Furthermore, EP 1 225 267 A1 describes a washing machine which comprises a sensor for identifying inserted textiles. The textiles can be recognized, for example, via a chip on the label of the textile. DE 298 24 311 U1 discloses the use of a hand-held reader for detecting data of a transponder attached to a textile, in particular, in cooperation with a washing machine. WO 02/082363 A1 describes a device for evaluating bar codes or RFID tags on textiles.

However, the problem with using special markings, such as RFID tags on the textiles, is that the production effort of the textiles and the manufacturing costs are significantly increased. Therefore, such systems have not prevailed so far. Furthermore, not all textiles to be treated can be equipped with corresponding markings or markings can be removed from the textiles so that not all textiles to be treated are reliably recognized by corresponding systems.

Alternatively, it is possible to dose the amount of cleaning agent by monitoring the water used in the cleaning. Here, for example, the amount of cleaning agent in the water is checked during cleaning and, if necessary, additional cleaning agent is added. However, the type and amount of textiles are not directly included in the dosage, so that corresponding methods can also be inaccurate.

SUMMARY

Against the background of the state of the art presented, it is the object of the present disclosure to at least partially reduce or avoid the problems described, that is, to reliably determine at least one treatment parameter for a treatment of the textile, and, in particular, optimum treatment of the textile, for example, to recommend an optimal amount of cleaning agent.

According to a first aspect of the present disclosure, a method performed by one or more devices is described, the method comprising: obtaining a geometry information item representative of a spatial location of a plurality of points of a surface of a textile; determining at least one treatment parameter for treating the textile at least partially based on the geometry information item; and outputting or triggering output of the at least one treatment parameter.

The geometry information item can, in particular, comprise a point cloud representative of the spatial position of a plurality of points of a surface of a textile. For example, the spatial position of the surface of a textile is specified via individual points in a coordinate system relative to a specific reference point. In particular, the geometry information item can provide information about the spatial extent or shape of the textile. Conceivable here is a one-dimensional or two-dimensional representation of the points of the surface, but advantageously the surface of the textile is represented point-wise three-dimensionally, whereby the shape of the surface can be specified over all three spatial dimensions using a geometry information item.

In particular, garments, curtains or bedding are understood to be textiles. Garments and bedding include, for example, shirts, T-shirts, dresses, jackets, sweaters, pants, blankets, slips, and covers. The textiles can comprise various materials, for example, natural fibers, chemical fibers or other materials such as leather. For example, a textile is to be understood as meaning a product which is made of at least 80% of its weight from textile raw materials. For example, fibers including animal hairs which can be spun or processed into textile fabrics are to be understood as textile raw materials.

The at least one treatment parameter is based at least in part on a geometry information item and can thus include a treatment parameter which is sensitive to the spatial extent of the textile. According to one embodiment of the method according to the first aspect, the determination of the at least one treatment parameter is based on determining the surface of the textile surface and/or on determining the volume which is spanned by the surface of the textile. It is also conceivable to determine the at least one treatment parameter based on one or more cross-sections of the surface.

The surface can be determined on the basis of the spatial position of the points of a geometry information item. For example, a modeling or interpolation between the points is made. Such interpolation can, in particular, be based on polygons or splines. For example, a polygon mesh having at least a part of the points from a geometry information item is determined as interpolation points. For example, the area of the surface, the spanned volume and cross-sections of the textile can be approximately determined based on a corresponding interpolation.

The determination of the at least one treatment parameter from a geometry information item and, in particular, from variables such as the area of the surface, the spanned volume and/or from cross-sections can be performed, for example, on the basis of mathematical functions and/or a comparison with comparison values. Corresponding comparison values can be stored in a database.

In a further embodiment of the method, the method further comprises: determining a user profile at least partially based on the at least one treatment parameter, in particular, based on a plurality of determined treatment parameters, wherein the determination of the at least one treatment parameter is based at least partially on the user profile.

A user profile can thus be created via the at least one treatment parameter, which profile is adapted to the respective requirements. In particular, a plurality of treatment parameters in the context of a history of determined treatment parameters can be included in a user profile, so that future determinations can be based at least partially on the user profile.

The at least one treatment parameter may, for example, specify at least one cleaning parameter. Also conceivable are further parameters of a pretreatment, conditioning treatment, drying, aftertreatment or smoothing. In particular, the at least one treatment parameter represents an amount of cleaning agent, a type of cleaning agent, a cleaning temperature, a type of cleaning device, settings of a cleaning device, or combinations thereof.

Cleaning agents are used, for example, in the household for the cleaning of different objects. For example, a cleaning agent, for example, a washing agent, for washing machines is used for cleaning textiles. However, a cleaning agent should likewise also be understood as meaning cleaning auxiliaries or cleaning additives, for example, a bleaching additive, a fabric softener or laundry starch. A cleaning agent can also be a liquid, a dispersed system, for example, a gel or foam, or a solid, in particular, a tab, powder or granules.

A cleaning agent can, for example, have one or more components from the group of components comprising surfactants, alkalis, builders, grayness inhibitors, optical brighteners, enzymes, bleach, soil release polymers, fillers, plasticizers, perfumes, dyes, conditioners, acids, starch, iso-malt, sugar, cellulose, cellulose derivatives, carboxymethylcellulose, polyetherimide, silicone derivatives, and/or polymethylimines.

A cleaning agent can further comprise one or more other ingredients. These ingredients include, but are not limited to, the group of bleach activators, chelants, builders, electrolytes, nonaqueous solvents, pH adjusters, perfume carriers, fluorescers, hydrotropes, silicone oils, bentonites, anti redeposition agents, anti-wear agents, anti-wrinkle agents, dye transfer inhibitors, anti-microbial active substances, germicides, fungicides, antioxidants, preservatives, corrosion inhibitors, anti-static agents, buttering agents, ironing auxiliaries, repellents or impregnating agents, swelling or slipping agents, and/or UV absorbers.

The at least one treatment parameter can represent the amount of cleaning agent and, in particular, indicate an absolute amount of the cleaning agent. Likewise, a relative amount of the cleaning agent can be specified, for example, a bath ratio or a cleaning agent amount based on a volume of water to be used for cleaning.

In particular, the amount of cleaning agent depends on the geometric extent of the textile, for example, the volume of the textile or the surface of the textile. Using the geometry information item, the geometrical extent of the textile, for example, the volume or the surface, can thus be taken into account when determining the cleaning parameter, for example, the amount of cleaning agent.

Consequently, the user can be given a recommendation of optimal treatment by the method according to the first aspect. For example, the optimum amount of cleaning agent is determined and output at least partially on the basis of a geometry information item, for example, via a determination of the volume and/or the surface of the textile. The determination of the amount of cleaning agent therefore no longer needs to be based on an estimate and can, in particular, be automated. Consequently, in a user-friendly manner, a treatment of the textile as completely as possible can be achieved with a simultaneous economic and ecological effectiveness of the treatment.

In one embodiment of the method according to the first aspect, the method further comprises performing a treatment of the textile at least partially based on the at least one treatment parameter, in particular, performing a cleaning treatment of the textile. The at least one treatment parameter can be output to a treatment device, wherein the treatment device adopts the at least one treatment parameter as a default. For example, the user merely has to start the treatment.

In particular, the treatment device can be configured to automatically consider one or more treatment parameters in a treatment. For example, the treatment device has a dosing device for a cleaning agent, wherein the optimal amount of cleaning agent determined via the method is automatically provided by the dosing device for the treatment.

In a further embodiment of the method according to the first aspect, the method comprises: obtaining a plurality of geometry information items representative of the spatial location of a plurality of points of a surface of a plurality of textiles; and determining at least one treatment parameter for treating the textiles based at least in part on the geometry information items. Usually, a plurality of textiles is to be subjected to a common treatment in a treatment device. For example, a variety of textiles are cleaned together. For this purpose, geometry information items can be obtained for each individual textile and used to determine the at least one treatment parameter. In a particularly simple embodiment, a summation of the variables determined from a geometry information item is performed. For example, the sum of the surfaces or volumes of the textiles is determined and used to determine the at least one treatment parameter.

In a further embodiment of the method, the geometry information item is representative of the spatial position of a plurality of points on at least one subsection of at least one cross-section of the surface of the textile. For example, at least one group of points lies in a plane which intersects the surface of the textile. The geometry information item can thus be characteristic for at least one subsection of one or more cross-sections through the surface, on the basis of which the at least one treatment parameter is determined.

In an embodiment of the method according to the first aspect, the method further comprises: determining a geometry information item representative of the spatial location of a plurality of points of the surface of the textile.

The determination of a geometry information item can be based on one or more different methods. A contact-based method is conceivable, for example, a mechanical scanning of the surface of the textile. Advantageously, however, a non-contact method for determining a geometry information item is used. Non-contact methods can be based, for example, on a reaction of the surface to radiation such as light, X-rays and/or particle radiation. The reaction of the surface to ultrasound can also be used to determine a geometry information item.

In this case, in particular, when determining a geometry information item via radiation, the determination can be made passively, wherein the reaction of the textile to an external excitation is examined, for example, to the ambient light. In a further embodiment of the method according to the first aspect, however, determining a geometry information item comprises applying an excitation to the surface of the textile. This allows a defined excitation of the textile and thus a more accurate determination of a geometry information item.

In particular, the excitation comprises a laser beam, with which both the energy of the radiation acting on the textile and the propagation direction of the radiation can be defined very precisely and the incoming radiation is substantially coherent.

In a further embodiment of the method according to the first aspect, the excitation is modulated in time. For example, the excitation can be based on a temporally varying intensity profile, whereby the determination of the spatial position of one or more points can be facilitated. Furthermore, the excitation can also be temporally varied in terms of its spatial orientation. For example, the propagation direction of the exciting radiation can be rotated and/or the starting point of the exciting radiation can be offset. In particular, the excitation starts from an excitation source moving relative to the textile.

In one embodiment of the method according to the first aspect, the determination of a geometry information item comprises a time-of-flight measurement (TOF). A length measurement or distance measurement via the transit time of a signal is made possible with a transit time measurement, taking into account the speed. For example, a temporally varying excitation, such as a laser pulse, is sent to the surface of the textile and its reflection or scattering is detected. The distance to the surface and thus the position of the point acted upon by the excitation can be determined via the transit time. For example, range finders, in particular, laser range finders, are used based on a transit time measurement.

In a further embodiment of the method according to the first aspect, the excitation is spatially structured one-dimensionally or two-dimensionally. Thus, the excitation does not only strike a single, approximately punctiform section of the surface, but strikes the surface in a spatially structured manner over certain sections. For example, the excitation can be applied simultaneously to a plurality of points of the surface. In this example, in particular, a speckle pattern can be sent as an excitation to the surface of the textile. Likewise, for example, linear sections of the surface can be excited or other one-dimensional or two-dimensional patterns can be brought to the surface as an excitation, wherein a spatial variation of the intensity of the excitation is performed.

In particular, the spatial position of a plurality of points of the surface is determined simultaneously with a spatial structuring of the excitation. Thus, the duration of the determination of a geometry information item can be shortened and its effectiveness can be increased.

For example, the determination of a geometry information item is based on the detected change or distortion of a specific, spatially structured excitation, for example, a one-dimensional or two-dimensional pattern, by the impact on the surface of the textile.

In a further embodiment of the method according to the first aspect, the determination of a geometry information item comprises a triangulation. The spatial position of a point of the surface can be determined particularly easily and particularly precisely for short distances with a triangulation.

The triangulation can be performed, for example, based on different positions and/or orientations of an excitation source and a sensor device. Likewise, a plurality of sensor devices, in particular, sensor fields, can be used, wherein the individual sensor devices cover different positions and/or orientations.

For example, at least one stereo camera and/or at least one line scan camera is used. A stereo camera here is understood as meaning not only stereoscopic sensor systems which have only two sensor units. Rather, a stereo camera in the context of this description can have two or more sensor units or cameras which form a stereoscopic sensor system.

The spatial position of points of the surface can be determined by comparing the individual images of the surface of sensor units or cameras from different perspectives. Various evaluation methods can be used, in particular, according to the methods known from the articles *"Development of a Video-Rate Stereo Machine"* by Takeo Kanade et al., Proceedings of International Robotics and Systems Conference 1995, Vol. 3, pp. 95-100 and *"Real time correlation-based stereo: algorithm, implementations and applications"* by Olivier Faugeras et al., Institut National de Recherche en Informatique et en automatique (INRIA), Rapport de Recherche, Programs 4, no. 2013, August 1993. The content of these articles and the features described therein are part of the disclosure of the present description.

According to a further embodiment of the method according to the first aspect, the determination of a geometry information item is time-dependent. For example, the surface of the textile is scanned over time to obtain the geometry information item. On the one hand, a more precise determination of a geometry information item can be achieved on the one hand, and on the other hand, the effectiveness of the determination, for example, with regard to limited computing capacities, can be improved. In particular, the determination of a geometry information item is performed time-dependently on a moving textile, for example, with a stationary sensor unit. Thus, the geometry information item can be determined, for example, before, during or after performing a treatment when movement of the textile is required.

For example, the geometry information item is determined when a treatment device is loaded or unloaded with the textile. It is further conceivable to determine a geometry information item during a treatment, for example, during a cleaning treatment.

In particular, the spatial position of a plurality of cross-sections of the surface of the textile is recorded in a temporal sequence. A time-dependent determination is performed, in particular, by a plurality of determinations taking place at time intervals with a moving sensor device and/or moving textile. In this case, the spatial position of a plurality of points of the surface, which are to be assigned to different cross-sections of the surface, are recorded by the determination in the different time intervals. The points of individual cross-sections determined in this way can be combined into a representation of the entire surface.

According to a further embodiment of the method according to the first aspect, the method is performed by at least one first device, in particular, an exemplary treatment device, and a second device, wherein the geometry information item representative of the spatial location of a plurality of points of a surface of a textile is obtained on the first device and is sent to the second device; wherein the geometry information item representative of the spatial location of a plurality of points of a surface of a textile is received on the second device; wherein the at least one treatment parameter for treating the textile is sent to the first device based at least in part on a geometry information item determined by the second device; and wherein the at least one treatment parameter is received at the first device.

The first device is, for example, a mobile device or a treatment device according to the second aspect, as is described in more detail below. The second device is, in particular, a (remote) server, in particular, a server, which is a computer cloud or a part thereof, as is also described in detail below. In particular, a non-local determination of the treatment parameter can be advantageous in the case of complex a geometry information item. A communication between the first device and the second device can take place, in particular, via a communication system, for example, at least partially via the Internet.

According to a second aspect, a treatment device for treating textiles comprising a sensor device for determining a geometry information item representative of the spatial position of a plurality of points of a surface of a textile is described. The treatment device is designed, in particular, for cleaning textiles. A treatment device is understood, in particular, as meaning an automatic household washing machine or a household dryer for textiles.

The determination of a geometry information item can be based on at least one contact-based method and/or at least one non-contact method. By way of example, the sensor device can be configured to detect a reaction of the surface to radiation such as light, X-rays and/or particle radiation and to determine a geometry information item based thereon. The geometry information item can be used, in particular, with the implementation of the previously described method according to the first aspect, to determine at least one treatment parameter, for example, the optimum amount of cleaning agent for a cleaning process.

In one embodiment of the treatment device according to the second aspect, an excitation source for acting on the surface of the textile is provided with an excitation, whereby a defined excitation for determining a geometry information item is provided by the sensor device. In particular, at least one laser source can be provided as the excitation source, or the excitation source can comprise at least one laser source.

In a further embodiment of the treatment device according to the second aspect, the sensor device comprises at least one stereo camera and/or at least one line scan camera. A stereo camera here is understood to mean not only stereoscopic sensor systems which have only two sensor units. Rather, a stereo camera in the context of this description can have two or more sensor units or cameras which form a stereoscopic sensor system.

The stereo camera or the line scan camera can, in particular, comprise a digital image sensor. In particular, at least one semiconductor element, diodes, CCD elements or CMOS elements can be used to determine the incident radiation. Conceivable is the use of monochrome sensors without color resolution or of sensors which are limited to certain wavelength ranges, for example, based on at least one photodiode and/or at least one LED element. However, the sensor device can also be configured to provide color information.

The sensor device can have further optical elements, for example, optical filters, reflective elements or mirrors, lenses, diaphragms, spectrometers, or the like.

In a further embodiment of the treatment device according to the second aspect, the sensor device comprises at least one range finder and/or depth sensor. If a range finder or depth sensor is arranged at a defined position with a defined orientation, the spatial position of at least one point of the surface of the textile can be determined via a distance measurement or depth measurement. A depth sensor is understood, in particular, as meaning a sensor based on a structured excitation, for example, similar to the functioning of sensor units which are marketed or were marketed under the name Kinect by the Microsoft Corporation. In particular, at least one laser range finder and/or at least one laser depth sensor are provided.

If the sensor device comprises a plurality of sensors, a plurality of points for the geometry information item can be determined at the same time. Additionally or alternatively, the treatment device according to the second aspect comprises in a further embodiment at least one movement device for moving the sensor device and/or the excitation source. In particular, the position and orientation of the sensors can be varied in time via a movable sensor device, so that additional points can be determined for the geometry information item. Different sections of the surface of the textile can thus be measured, for example, the textile can be viewed from different perspectives or scanned over the surface of the textile. Different sections of the surface can likewise be subjected to the excitation via a movement of the excitation source. Likewise, a movement device for moving optical elements, for example, for a reflective element, can be provided.

In a further embodiment of the treatment device according to the second aspect, the treatment device has a loading opening for textiles and the sensor device and/or excitation source are arranged at the loading opening. Household washing machines or household dryers usually have a drum as a container for the textiles to be treated, wherein the drum is accessible via a loading opening for loading or unloading. The sensor device can be arranged on such a loading opening, in particular, in the region of the edge of the loading opening or on a door for closing the loading opening. Likewise, the sensor device can be arranged on a container for the textiles to be treated, for example, a drum. Thus, the determination of a geometry information item can be performed, in particular, when the user loads or unloads the treatment device. For example, the sensor device is activated with the start of the loading and provides a geometry information item for all textiles introduced into the treatment device. Upon completion of loading, the geometry information item can be characteristic of the spatial extent of all textiles to be treated in the treatment device. A method according to the first aspect can be performed to give the user a recommendation about optimal treatment parameters.

According to a third aspect, a device is described which is configured as or comprises corresponding features for performing and/or controlling a method according to the first aspect.

The device comprises, in particular, a mobile device or is designed as a mobile device. The mobile device is for example, a smart phone, laptop, tablet, wearable or camera and can communicate with at least one further device, for example, a treatment device and/or a sensor device. According to one embodiment, the device according to the third aspect comprises a communication interface. For example, the communication interface is configured for wired or wireless communication. For example, the communication interface is a network interface. The communication interface is preferably configured to communicate with a communication system. Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network, and/or the Internet. A communication system can comprise communication with an external computer, for example, via an Internet connection.

The mobile device can be designed, in particular, for determining the at least one treatment parameter and determine, for example, variables such as surface area and volume of the textile. Likewise, the determination of the at least one treatment parameter can be performed by a further device, which is, in particular, connected via a communication system to the device which provides a geometry information item. A server can be provided for this purpose which executes the evaluation or causes further devices to perform the evaluation. Such a server is, for example, a database server. Examples of a database server include Microsoft SQL Server, Oracle Server, and MySQL Server. For example, the servers can be part of a so-called computer cloud that provides data processing resources dynamically to various users in a communication system. A computer cloud is understood, in particular, as meaning a data processing infrastructure as defined by the National Institute for Standards and Technology (NIST) for the English term "cloud computing". An example of a computer cloud is a Microsoft Windows Azure Platform. In particular, a computer cloud can be viewed as a network-side storage that can store and provide information (such as a geometry information item or a treatment parameter). In particular, the computer cloud can then provide this information to certain services, users, and other devices.

In particular, a device according to the different aspects can have communication channels and a preferably secure connection to the cloud advantageously also have the necessary interfaces and requirements for receiving and processing control commands from the cloud, so that in particular, a control of a treatment device can be taken over by a service running on the network side. Furthermore, control parameters can also be changed via a service running on the network in order to start an operation or also to abort a running or planned operation.

In particular, the device according to the third aspect is configured for cooperation with a treatment device according to the second aspect, or the device comprises a treatment device according to the second aspect.

According to the third aspect of the present disclosure, an alternative device is also described, comprising at least one processor and at least one memory having computer program code, wherein the at least one memory and the computer program code are configured to execute and/or to control at least one method according to the first aspect with the at least one processor. For example, a processor is understood as meaning a control unit, a microprocessor, a microcontrol unit such as a microcontroller, a digital signal processor (DSP), an application specific integrated circuit (ASIC), or a field programmable gate array (FPGA).

For example, an exemplary device further comprises features for storing information such as a program memory and/or a main memory. For example, an exemplary device as contemplated herein further includes features for receiving and/or sending information over a network, such as a network interface. For example, exemplary devices as contemplated herein are connected to each other and/or connectable to each other via one or more networks.

An exemplary device according to the third aspect is or comprises, for example, a data processing system that is configured in terms of software and/or hardware in order to be able to execute the respective steps of an exemplary method according to the first aspect. Examples of a data processing system include a computer, a desktop computer, a server, a thin client and/or a portable computer (mobile device), such as a laptop computer, a tablet computer, a wearable, a personal digital assistant or a smart phone.

According to the third aspect of the present disclosure, there is also described a computer program comprising program instructions that cause a processor to execute and/or control a method according to the first aspect when the computer program is run on the processor. An exemplary program as contemplated herein can be stored in or on a computer-readable storage medium containing one or more programs.

According to the third aspect of the present disclosure, there is also described a computer-readable storage medium containing a computer program according to the second aspect. A computer-readable storage medium can be formed, for example, as a magnetic, electrical, electro-magnetic, optical and/or other type of storage medium. Such a computer-readable storage medium is preferably graphical (that is, "touchable"), for example, it is formed as a data carrier device. Such a data carrier device is for example, portable or permanently installed in a device. Examples of such a data carrier device are volatile or non-volatile random access memory (RAM) such as NOR flash memory or having sequential access such as NAND flash memory and/or read-only access memory (ROM) or read-write access. For example, computer readable is to be understood as meaning that the storage medium can be read and/or written by a computer or a data processing system, for example, by a processor.

According to the third aspect of the present disclosure, there is also described a system comprising a plurality of devices, in particular, a mobile device and a treatment device, which together perform a method according to the first aspect.

An exemplary system according to the third aspect comprises an exemplary cleaning device and additionally a further device, for example, a mobile device or a server for performing an exemplary method according to the first aspect.

In particular, the system according to the third aspect can also further comprise at least one textile or a set of textiles.

The exemplary embodiments of the present disclosure described above in this description are also to be understood as being disclosed in all combinations with one another. In particular, exemplary embodiments are to be understood in terms of the different aspects disclosed.

In particular, the preceding or following description of method steps according to preferred embodiments of a method also discloses corresponding features for performing the method steps by preferred embodiments of a device. Likewise, the disclosure of features of a device for performing a method step is intended to also disclose the corresponding method step.

Further advantageous exemplary embodiments of the present disclosure can be found in the following detailed description of some exemplary embodiments of the present disclosure, in particular, in conjunction with the figures. However, the figures should only serve the purpose of clarification, but not to determine the scope of the present disclosure. The figures are not to scale and are merely intended to reflect the general concept of the present disclosure. In particular, features included in the figures should by no means be considered as a necessary component of the present disclosure.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Figure 1:
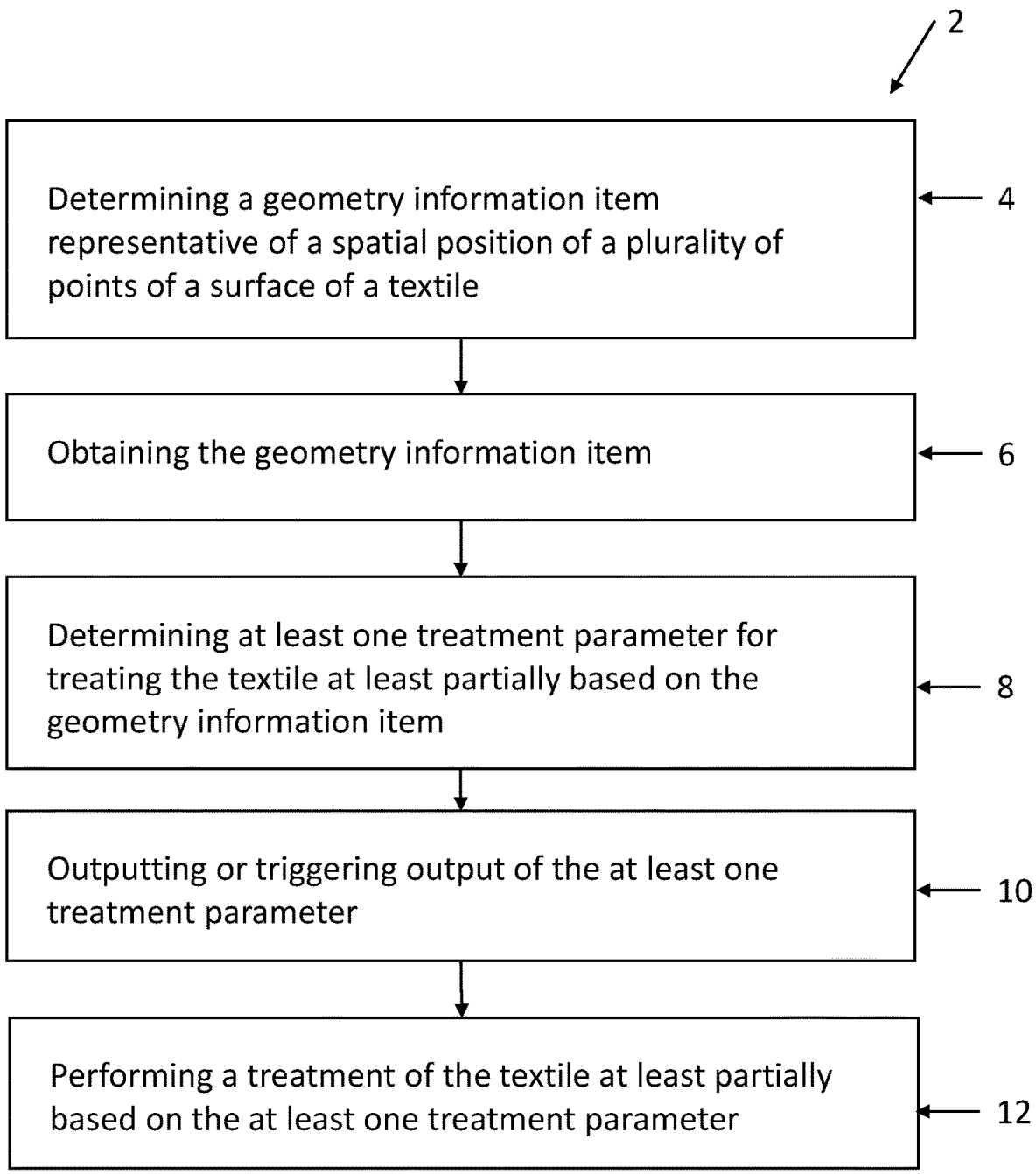
FIG. 1 is a flowchart of an embodiment of a method.

FIG. 1 shows a flow chart 2 of an embodiment of a method according to the first aspect, which is performed by a device, for example, by one of the devices from the following figures or in cooperation with one of the devices from the following figures.

A geometry information item representative of the spatial position of a plurality of points of the surface of a textile is determined in action 4. In particular, the geometry information item can comprise a point cloud representative of the spatial position of a plurality of points of the surface of a textile and can be characteristic of the spatial extent or shape of the textile. The determination of a geometry information item can, in particular, comprise applying an excitation to the surface of the textile, for example, using a laser beam, and the use of a laser range finder or laser depth meter. A stereo camera can also be used, for example.

The geometry information item representative of the spatial location of a plurality of points of the surface of the textile is obtained in action 6. For example, action 4 is performed by a device having a sensor device and the geometry information item is received from a further device in action 6.

At least one treatment parameter for treating the textile is determined based at least in part on a geometry information item in action 8. The determination includes, for example, a modeling or interpolation of the spatial position of the points for modeling the surface, for example, via polygons or splines. The determination can comprise, for example, the determination of the area of the surface, of the spanned volume and of cross-sections.

A recommendation of an optimal treatment of the textile can be given via the at least one treatment parameter, since the treatment parameters, for example, depend on the volume and/or surface of the textile to be treated. The determination of the at least one treatment parameter can be performed, for example, on the basis of mathematical functions and/or a comparison with comparison values. The at least one treatment parameter comprises, in particular, an amount of cleaning agent or an amount of washing agent for a cleaning treatment.

The at least one treatment parameter is output in action 10 or its output is triggered and, for example, made available to the user on a display. Likewise, the at least one treatment parameter can be output to a treatment device.

A treatment of the textile is performed with action 12, wherein the treatment is based at least partially on the at least one treatment parameter, which is determined in action 8. In particular, a cleaning treatment of the textile is performed, for example, using an amount of cleaning agent which was determined on the basis of a geometry information item.

Figure 2:
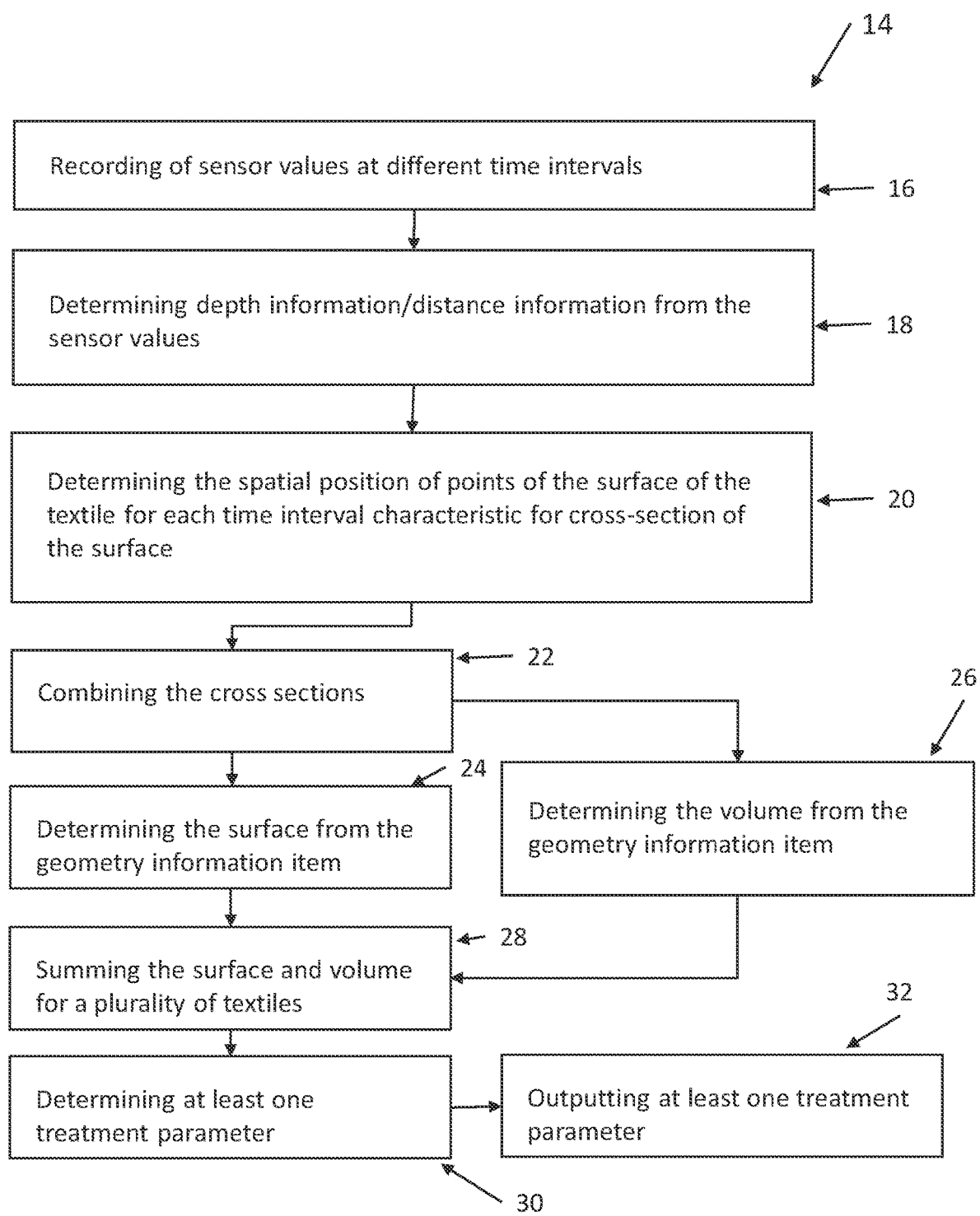
FIG. 2 is a flowchart of a further embodiment of a method.

FIG. 2 shows a flowchart 14 of a further embodiment of a method according to the first aspect, which is performed by one or more devices.

Sensor values are recorded by a sensor device in action 16. In this exemplary embodiment, sensor values are recorded on a moving textile or via a moving sensor device at different time intervals, so that sensor values representative of different cross-sections of the surface of the textile are recorded for different time intervals. For example, a sensor device based on a transit time measurement is used and the sensor values are representative of the transit time of a signal. Likewise, a triangulation-based sensor device can be used, and the sensor values are representative of a measurement angle, for example.

In action 18, depth information or distance information is determined from the sensor values, for example, on the basis of the transit time or the measurement angle in connection with the geometry of the sensor device. Information representative of the spatial position of points of the surface of the textile can be determined via the depth information or distance information and the arrangement of the sensor device in action 20. Points of a cross-section of the surface can thus be determined for each time interval.

The cross-sections are combined in action 22, in particular, taking into account the respective measurement times. A geometry information item is thus created.

The area of the surface (action 24) and/or the spanned volume (action 26) can be determined from this geometry information item, for example, via a modeling or interpolation of the spatial position of the points of the surface.

Actions 16-26 can be performed on a variety of textiles to be treated together. The geometry information item of the various textiles is combined in action 26, in particular, via a summation of the determined surfaces and the determined volumes.

Finally, at least one treatment parameter for the textiles is determined from the combined a geometry information item in action 30 and output in action 32.

Figure 3:
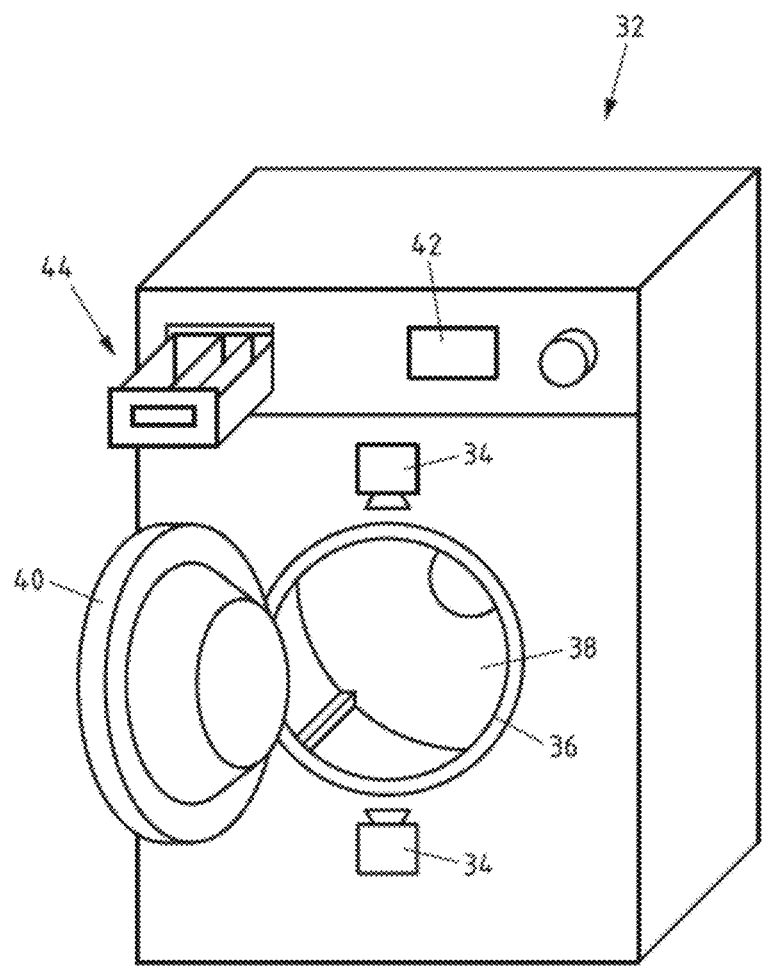
FIG. 3 is a schematic representation of an embodiment of a treatment device.

FIG. 3 shows an embodiment of a treatment device 33 for treating textiles according to the second aspect in a perspective schematic representation. The treatment device 33 is designed as a household washing machine for cleaning textiles. The treatment device 33 has a sensor device 34 for determining a geometry information item representative of the spatial position of a plurality of points of a surface of a textile.

The treatment device 33 has a loading opening 36 for textiles, wherein the sensor device 34 is arranged on the loading opening 36. A drum 38 as a container for the textiles to be treated and a door 40 for closing the loading opening 36 are provided, wherein the sensor device 34 can also be arranged in principle on the drum 38 and/or door 40. The determination of a geometry information item can take place via the sensor device 34 at the loading opening 36 when the user loads the treatment device 33.

Via the sensor device 34, sensor values can be recorded which can be used to determine a geometry information item and are used, for example, via a method according to the first aspect for determining optimal treatment parameters, for example, for determining an optimal amount of cleaning agent. The method can be performed by the treatment device 33 itself or by another device (not shown in FIG. 3) that is in communication with the treatment device 33. The treatment parameters can be provided to the user on a display 42, for example. Furthermore, a dosing device 44 can be provided which is used for dosing the amount of cleaning agent and, for example, automatically provides the determined, optimal amount of cleaning agent for a treatment.

Figure 4:
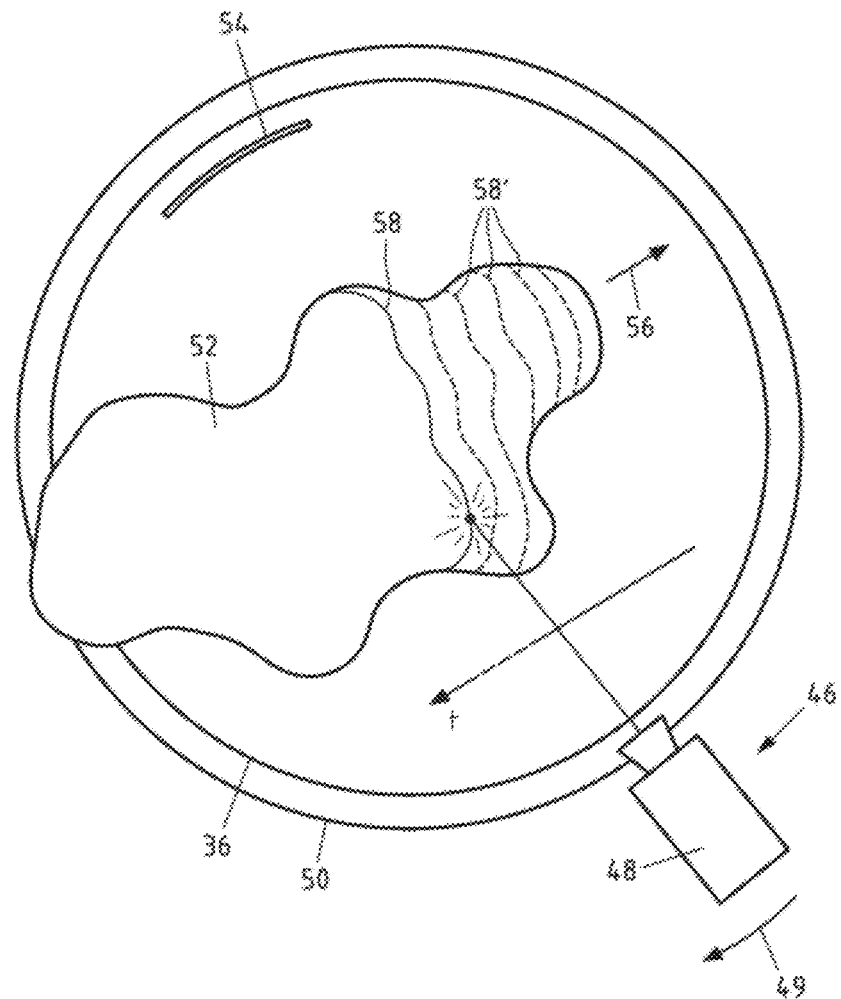
FIG. 4 is a schematic representation of an embodiment of a sensor device.

An embodiment of a sensor device 46 is shown schematically in FIG. 4. In FIG. 4, the sensor device 46 is arranged at the loading opening 36 of a treatment device, however, the sensor device 46 can also be arranged at other locations of a treatment device or else at a further device.

The sensor device 46 has a range finder in the form of a laser range finder 48, the operation of which is based, for example, on a transit time measurement or a triangulation. Furthermore, a rail 50 is provided as a movement device for movement of the sensor device 46, wherein the movement is indicated by the arrow 49. In the embodiment, the rail 50 runs along the circumference of the loading opening 36. As a result, distances between the sensor device 46 and an object such as the textile 52 can be recorded at various angles along the circumference of the loading opening 36. The corresponding rotation angle is referred to as ϕ in this embodiment. A reflective element 54 is provided opposite the laser range finder 48 and is used, for example, as a reference for the distance measurement. The reflective element 54 is also movably arranged, for example, via the rail 50.

If a textile 52 is now introduced into the loading opening 36, a geometry information item about the sensor device 46 can be determined. The determination is time-dependent in this embodiment, wherein the textile 52 is moved, as indicated by the arrow 56. The movement of the textile 52 is based, for example, on a loading of a treatment device by the user. Distances are recorded at different angles ϕ via the laser range finder 48 along a cross-section 58 of the surface of the textile 52. In particular, different cross-sections 58' of the textile 52 are thus scanned over the time t with the movement of the textile 52 in order to determine a geometry information item representative of at least sections of the surface of the textile 52. In principle, the rotational speed of the sensor device 46 along the circumference can also be in the order of magnitude of the movement speed of the textile 52 and a spiral course of points along the surface of the textile 52 can be recorded.

Figure 5A:
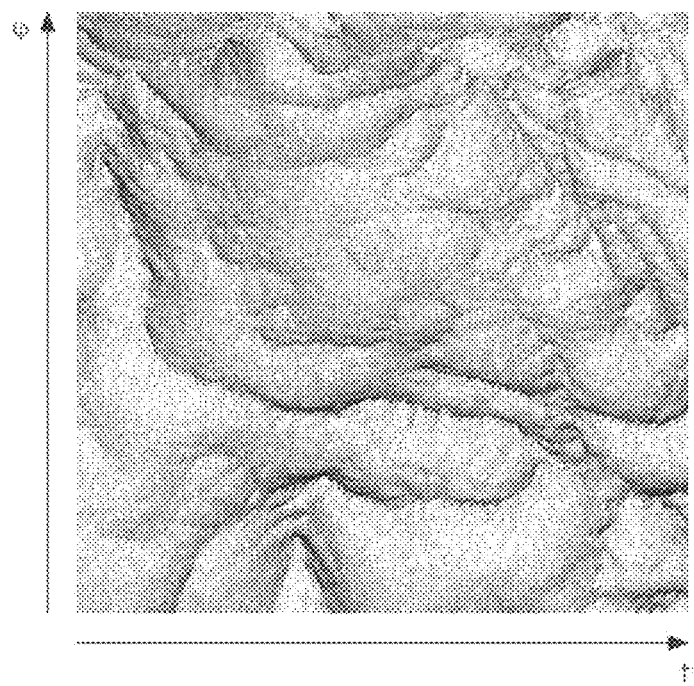
FIG. 5*a, b* are schematic representations of an embodiment of a geometry information item.
Figure 5B:
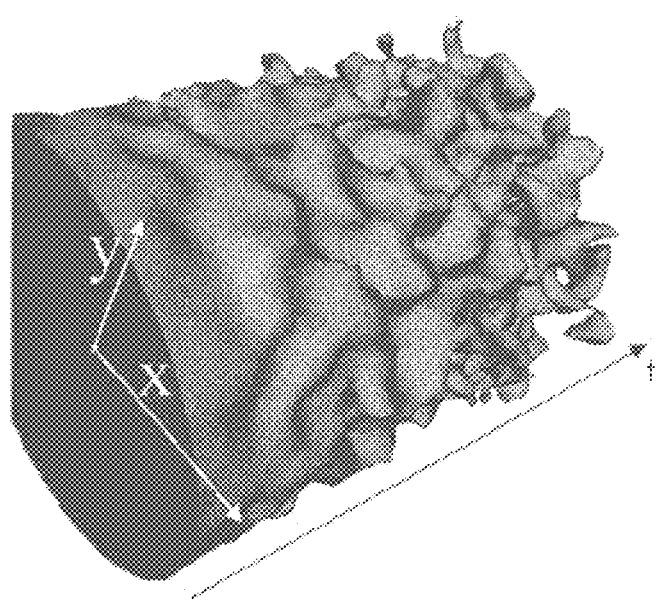

As shown in FIGS. 5a and 5b, the spatial position of points of the surface can be determined using the described distance measurement. The measured distance from the laser range finder 48 to the surface of the textile 52 is shown in FIG. 5a as a gray level for various angles ϕ and times t. From this, the spatial position of the surface in Cartesian coordinates x, y can be determined, for example, for different times t, as shown in FIG. 5b.

Figure 6A:
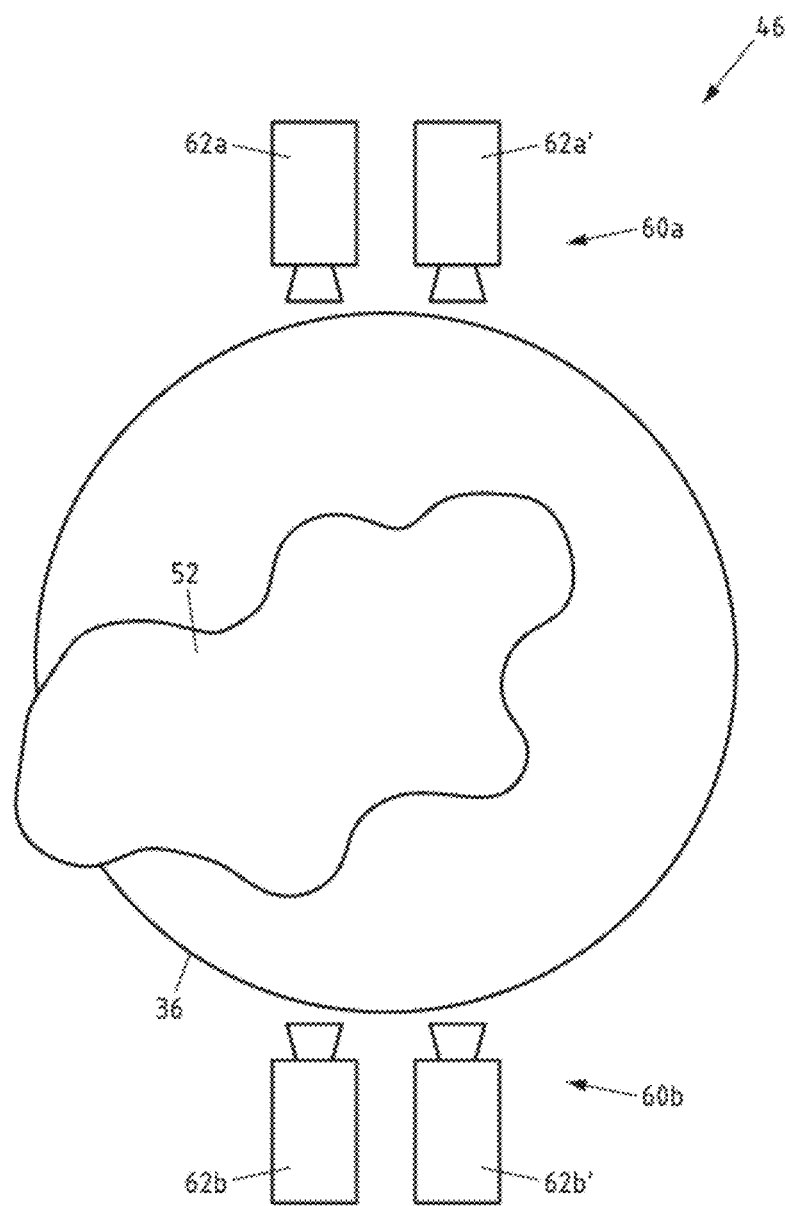
FIGS. 6*a-c* are schematic representations of further embodiments of a sensor device.
Figure 6B:
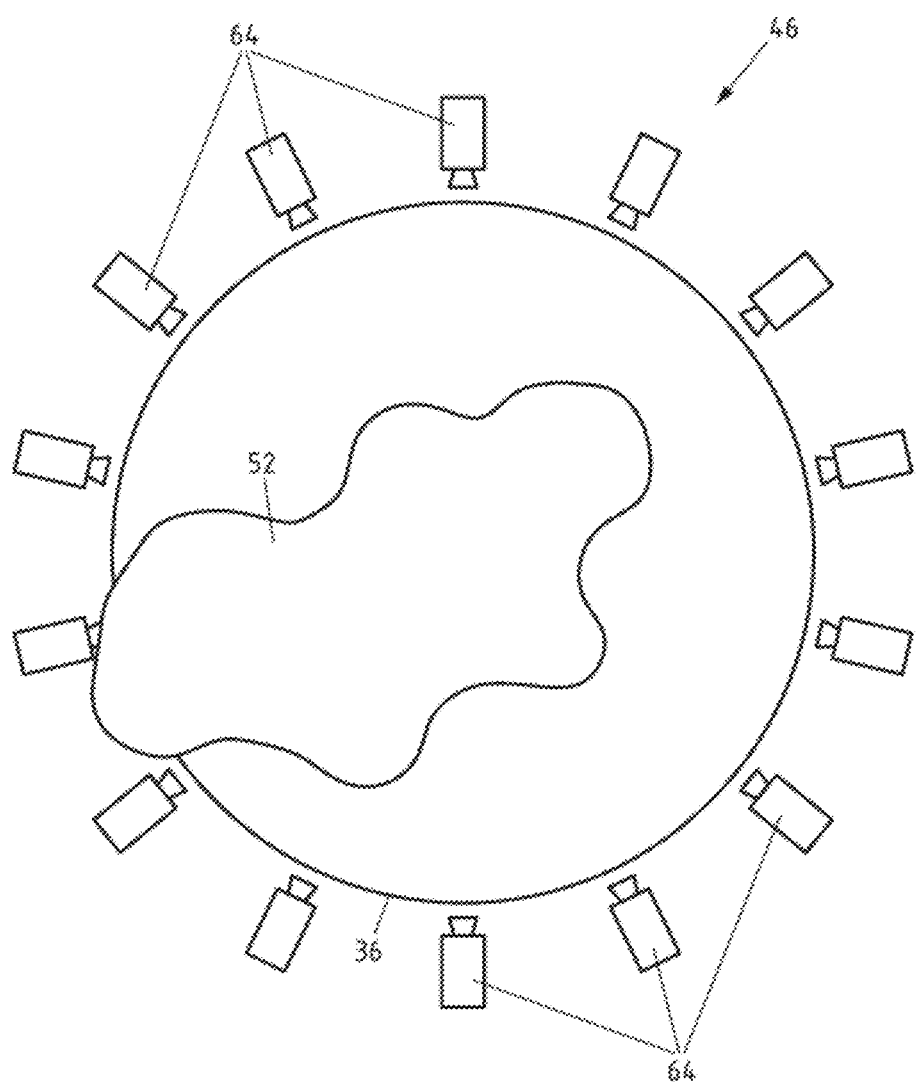
Figure 6C:
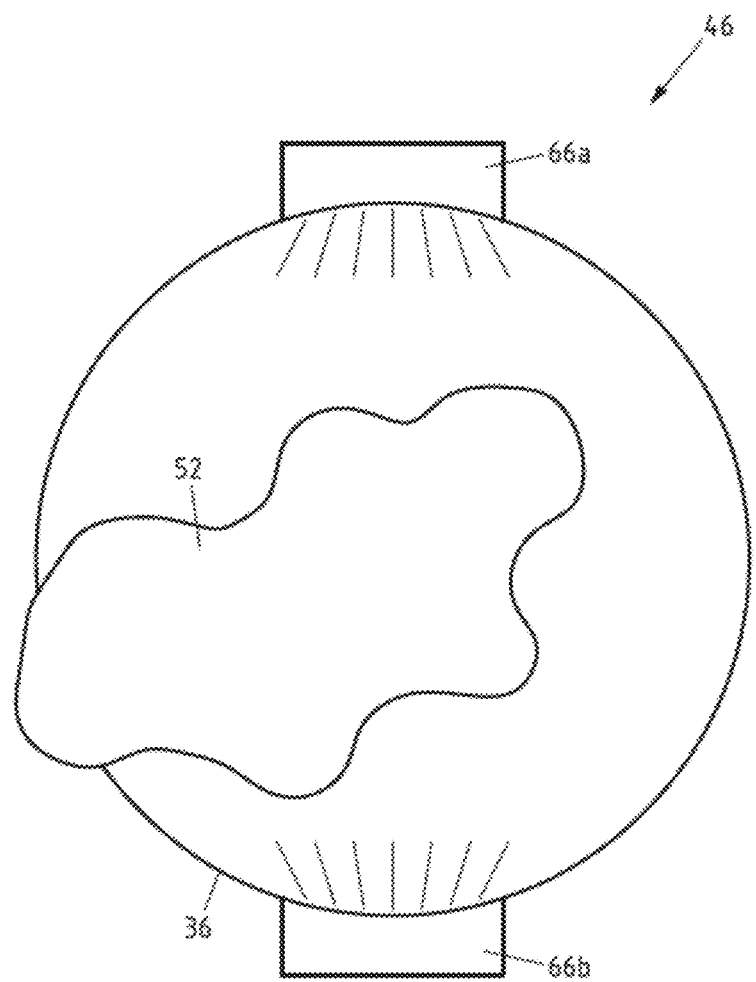

FIGS. 6a-c show further embodiments of a sensor device 46. In FIG. 6a, stereo cameras 60a, b are provided on the loading opening 36, in particular, at least on two sides. The stereo cameras 60a, b each have at least two cameras 62a, 62a'; 62b, 62b', which record the surface of the textile 52 from different perspectives. A geometry information item which represents the spatial position of points of the surface of the textile 52 can be determined by comparing the images of the cameras 62a, 62a'; 62b, 62b'.

A sensor device 46 is shown in FIG. 6b, wherein a plurality of sensors 64 is distributed as a sensor array along the circumference of the loading opening 36. The sensors are based, for example, on stereo cameras, line scan cameras, range finders and/or depth sensors, and can simultaneously detect a plurality of points on the surface of the textile 52. For example, the sensors 64 are evenly distributed at substantially equal intervals along the circumference.

FIG. 6c shows a sensor device having scanning laser devices or laser depth sensors 66a, 66b, which are arranged on opposite sides of the loading opening 36. The laser depth sensors 66a, 66b have, for example, a movable laser source or a laser source for spatially structured excitation of the surface of the textile 52. For example, a plurality of points of the surface can thus be measured simultaneously.

Figure 7:
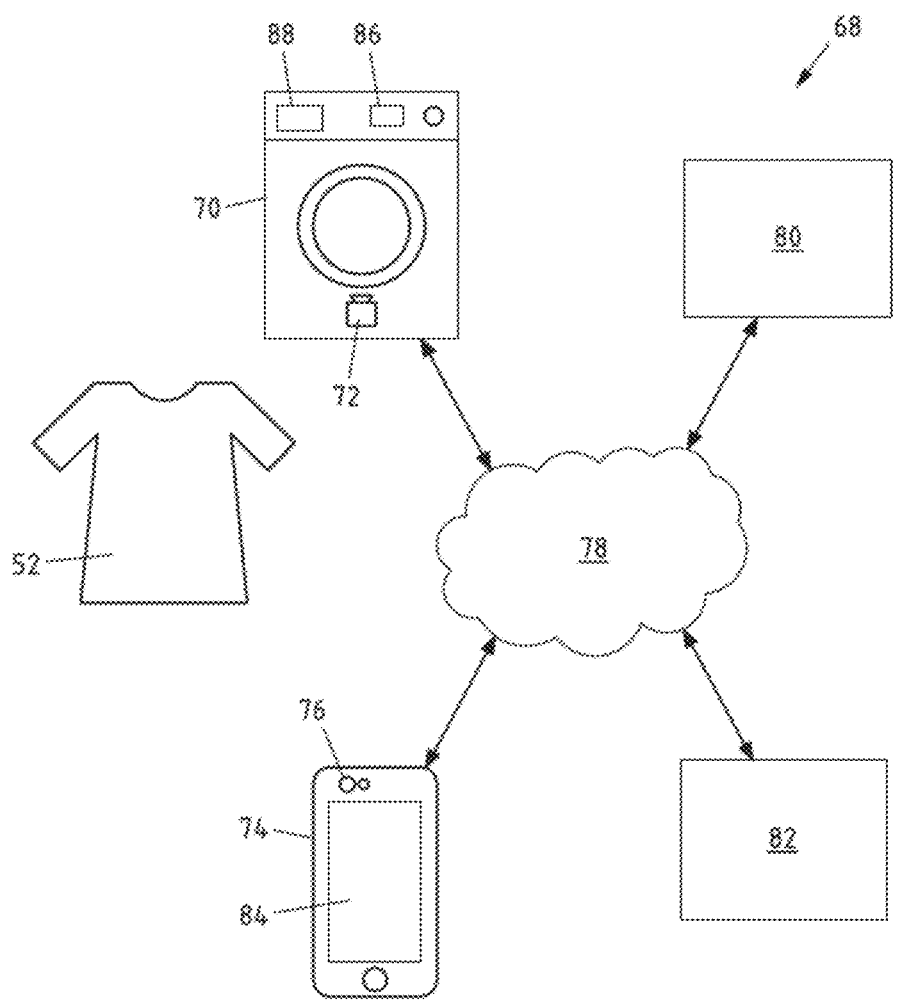
FIG. 7 is a schematic representation of an embodiment of a device.

FIG. 7 shows an embodiment of a device 68 according to the third aspect. The device 68 is configured as or comprises corresponding features for performing and/or controlling a method according to the first aspect.

In particular, the device 68 determines at least one treatment parameter based on a geometry information item representative of the spatial location of a plurality of points of a surface of a textile 52 and thus provides a recommendation about treatment parameters.

At least a part of the device 68 can be configured to determine the geometry information item. For example, a treatment device 70 having a sensor device 72 is provided, wherein the geometry information item is determined via the sensor device 72. The treatment device 70 is, in particular, a treatment device according to the second aspect. Alternatively or cumulatively, a mobile device, here a smart phone 74 having a sensor unit 76 for determining a geometry information item can be configured.

The geometry information item can be obtained, for example, from the smart phone 74 or a communication system 78 which is in communication with the treatment device 70 and the smart phone 74.

For example, the smart phone 74 is configured to determine the at least one treatment parameter based at least in part on a geometry information item. Alternatively or cumulatively, an evaluation device 80 can also be provided, which can execute at least part of the determination of the at least one treatment parameter. The determination can, for example, also comprise a comparison with comparison values which are stored, in particular, on a database 82.

The at least one treatment parameter can be output, for example, on a display 84 of the smart phone 74. The at least one treatment parameter can also be output to the treatment device 70 and, for example, be made available there to the user on a display 86.

The user can then perform a treatment according to the output treatment parameter. In addition, an automated version of such a treatment can be provided. For example, the treatment device 70 has a dosing device 88 for metering an amount of cleaning agent when performing a cleaning treatment. The dosing device 88 can provide a recommended amount of cleaning agent in accordance with the determined treatment parameters and supply them during a cleaning treatment.

Figure 8:
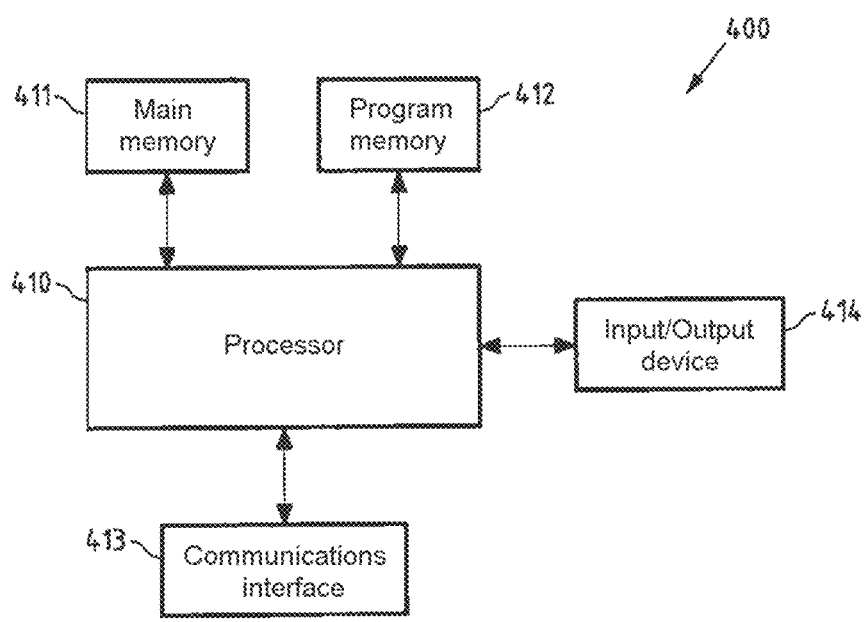
FIG. 8 is a schematic representation of a further embodiment of a device.

FIG. 8 shows a block diagram of an embodiment of a device 400, which, in particular, can execute an exemplary method according to the first aspect. The device 400 is, for example, a device according to the third aspect. Furthermore, a device according to the second aspect can also comprise such a device according to FIG. 8.

The device 400 can be, for example, a computer, a desktop computer, a server, a thin client, or a portable computer (mobile device), such as a laptop computer, a tablet computer, a personal digital assistant (PDA), or a smart phone. For example, the device can fulfill the function of a server or a client.

Processor 410 of device 400 is particularly formed as a microprocessor, microcontrol unit, microcontroller, digital signal processor (DSP), application specific integrated circuit (ASIC) or field programmable gate array (FPGA).

Processor 410 executes program instructions stored in program memory 412 and, for example, stores intermediate results or the like in working or main memory 411. For example, program memory 412 is a nonvolatile memory such as a flash memory, a magnetic memory, an EEPROM memory (electrically erasable programmable read only memory), and/or an optical memory. Main memory 411 is, for example, a volatile or non-volatile memory, in particular, a random access memory (RAM) such as a static RAM (SRAM), a dynamic RAM (DRAM), a ferroelectric RAM (FeRAM), and/or a magnetic RAM memory (MRAM).

Program memory 412 is preferably a local data carrier permanently attached to device 400. Data carriers permanently connected to the device 400 are, for example, hard disks which are built into the device 400. Alternatively, the data carrier may, for example, also be a data carrier which can be connected in separable manner to the device 400, such as a memory stick, a removable data carrier, a portable hard disk, a CD, a DVD, and/or a diskette.

Program memory 412 contains, for example, the operating system of device 400, which is at least partially loaded into main memory 411 and executed by processor 410 when device 400 is started. In particular, when device 400 starts, at least a part of the kernel of the operating system is loaded into main memory 411 and executed by processor 410. The operating system of device 400 is, for example, a Windows, UNIX, Linux, Android, Apple iOS, and/or MAC operating system.

In particular, the operating system enables the use of the device 400 for data processing. It manages, for example, resources such as main memory 411 and program memory 412, communications interface 413, input and output device 414, provides basic functions, among other things through programming interfaces, to other programs and controls the execution of programs.

Processor 410 controls communications interface 413, which can be, for example, a network interface and can be in the form of a network card, network module and/or modem. The communications interface 413 is, in particular, configured to establish a connection of the device 400 to other devices, in particular, via a (wireless) communication system, for example, a network, and to communicate with them. The communications interface 413 can, for example, receive data (via the communication system) and forward it to processor 410 and/or receive and send data (via the communication system) from processor 410. Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network, and/or the Internet.

Furthermore, processor 410 can control at least one input/output device 414. Input/output device 414 is, for example, a keyboard, a mouse, a display unit, a microphone, a touch-sensitive display unit, a loudspeaker, a reading device, a drive and/or a camera. For example, input/output device 414 can receive inputs from a user and forward them to processor 410 and/or receive and output information to the user of processor 410.

Figure 9:
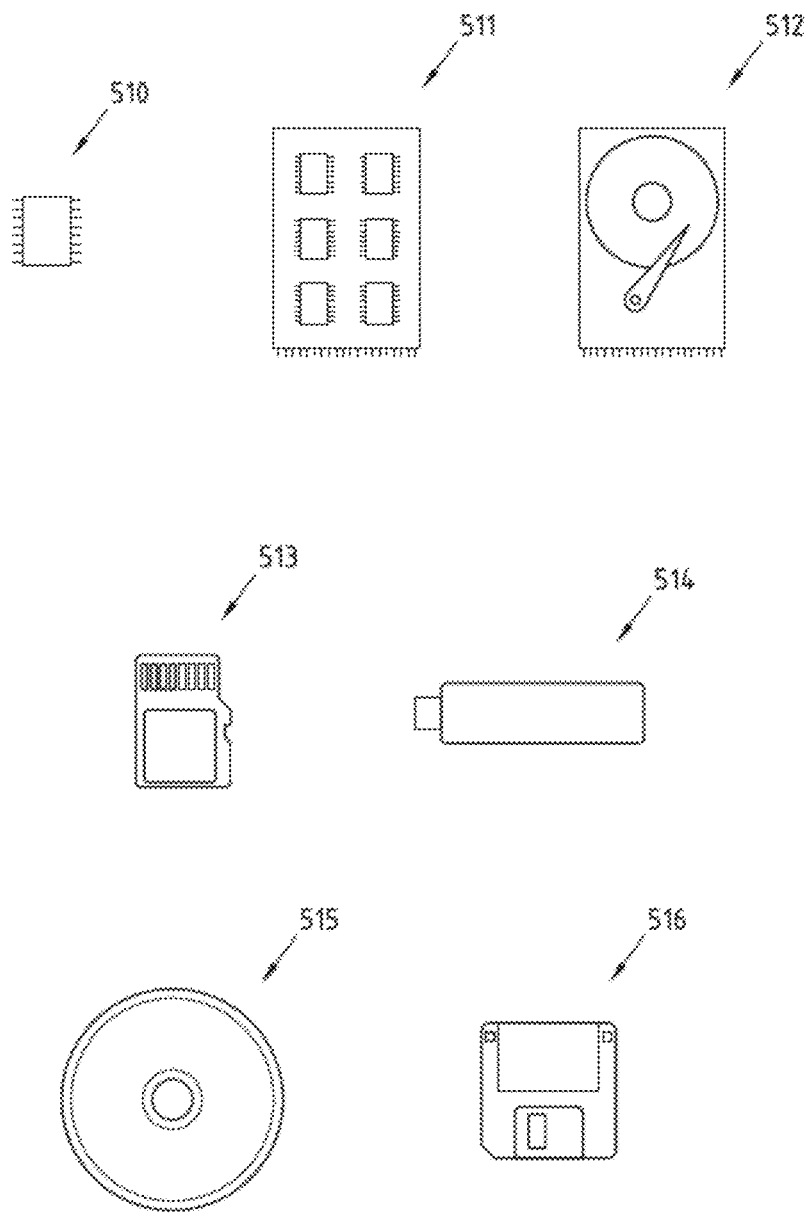
FIG. 9 illustrate different embodiments of a storage medium.

Finally, FIG. 9 shows different embodiments of storage media on which an embodiment of a computer program as contemplated herein can be stored. The storage medium can be, for example, a magnetic, electrical, optical and/or other type of storage medium. For example, the storage medium can be part of a processor (for example, processor 410 of FIG. 8), such as a (non-volatile or volatile) program memory of the processor or a part thereof (such as program memory 412 in FIG. 8). Embodiments of a storage medium are a flash memory 510, an SSD hard disk 511, a magnetic hard disk 512, a memory card 513, a memory stick 514 (for example, a USB stick), a CD-ROM or DVD 515, or a diskette 516.

The exemplary embodiments of the present disclosure described in this specification and the respective optional features and properties cited in this context should also be understood to be disclosed in all combinations with one another. In particular, the description of a feature encompassed by an exemplary embodiment is, unless explicitly explained to the contrary, not to be understood in this case as meaning that the feature is essential or fundamental for the function of the embodiment. The sequence of the method steps described in this specification in the individual flowcharts is not mandatory, alternative sequences of the method steps are conceivable. The method steps can be implemented in various ways, so that an implementation in software (by program instructions), hardware, or a combination of both to implement the method steps is conceivable.

Terms used in the patent claims, such as "comprising", "having", "including", "containing" and the like, do not exclude further elements or steps. The phrase "at least partially" includes both the "partial" and "completely" cases. The phrase "and/or" is to be understood as meaning that both the alternative and the combination is intended to be disclosed, that is, "A and/or B" means "(A) or (B) or (A and B)". The use of the indefinite article does not exclude a plurality. A single device can execute the functions of a plurality of units or devices mentioned in the patent claims. Reference numerals indicated in the claims are not to be regarded as limitations on the means and steps used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method performed by a cleaning device having a loading opening and a container for textile treatment comprising:
    detecting a spatial location of a plurality of points of a surface of a textile as the textile passes through the loading opening by applying an excitation by a laser beam to the surface of the textile and the detecting the spatial location of the plurality of points of the surface of the textile includes triangulation with a stereo detector;
    determining a plurality of cross sections of the textile in response to the detecting the spatial location of the plurality of points;
    determining an area of the surface of the textile in response to the determining the plurality of cross sections of the textile;
    determining at least one treatment parameter for treating the textile based at least in part on the area of the surface of the textile; and
    performing a treatment of the textile based on the at least one treatment parameter.

2. The method according to claim 1, wherein determining the at least one treatment parameter is based on determining a volume spanned by the surface of the textile.

3. The method according to claim 1, wherein the at least one treatment parameter indicates at least one cleaning parameter.

4. The method according to claim 1, wherein the excitation is one-dimensionally or two-dimensionally spatially structured.

5. The method according to claim 1, wherein the spatial location of the plurality of points of the surface of the textile is recorded in a temporal sequence.

6. The method according to claim 1, performed by a first device and a second device,
    wherein the area of the surface of the textile is obtained at the first device mounted at the loading opening and sent to the second device;
    wherein the area of the surface of the textile is received on the second device;
    wherein the at least one treatment parameter for treating the textile is determined by the second device based at least in part on the area of the surface of the textile and sent to the first device;
    and
    wherein the at least one treatment parameter is received at the first device.

7. The method according to claim 3, wherein the at least one cleaning parameter is an amount of cleaning agent.

8. The method according to claim 1, wherein the performing step is further defined as performing a cleaning treatment of the textile based at least partially on the at least one treatment parameter.

* * * * *